Oct. 24, 1944. G. C. LAWRIE 2,361,299
PIVOT FORMING MECHANISM FOR BALANCING MACHINES
Filed Dec. 31, 1941 3 Sheets-Sheet 1
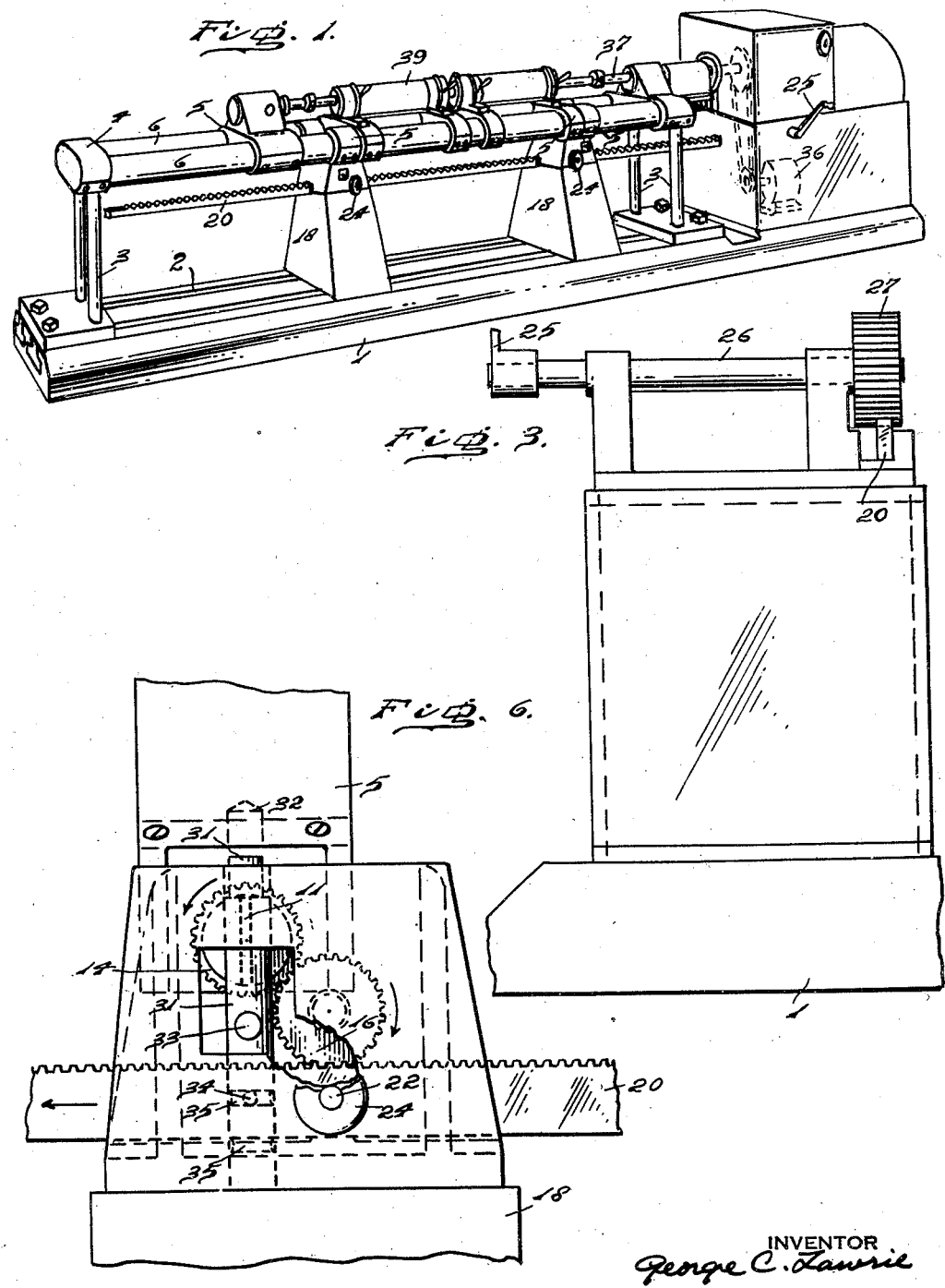
INVENTOR
George C. Lawrie
BY
Herbert S. Fairbanks
ATTORNEY

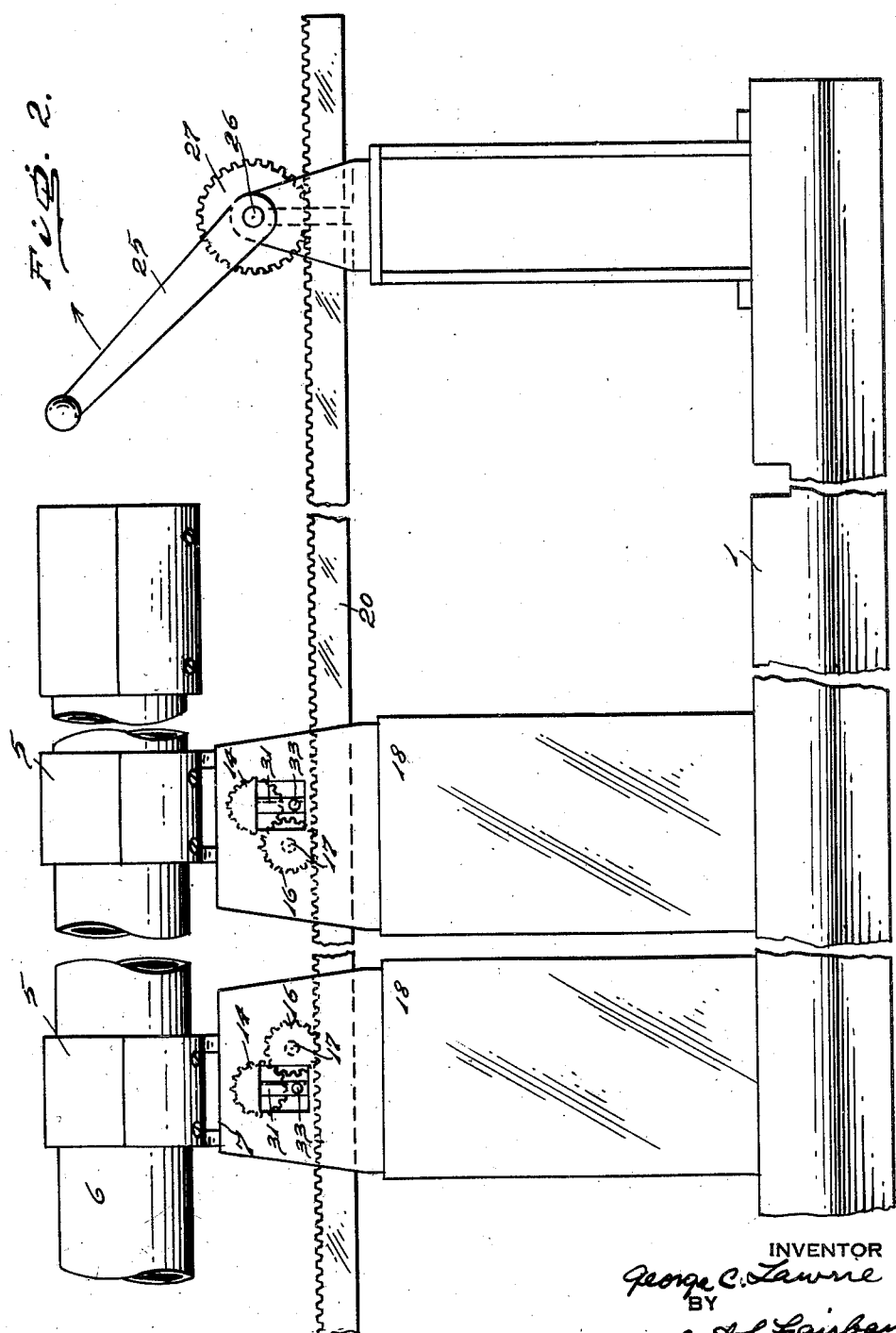

Oct. 24, 1944.   G. C. LAWRIE   2,361,299
PIVOT FORMING MECHANISM FOR BALANCING MACHINES
Filed Dec. 31, 1941   3 Sheets-Sheet 3

INVENTOR
George C. Lawrie
BY
Herbert S. Fairbanks
ATTORNEY

Patented Oct. 24, 1944

2,361,299

UNITED STATES PATENT OFFICE 2,361,299

PIVOT FORMING MECHANISM FOR BALANCING MACHINES

George C. Lawrie, Collingswood, N. J., assignor to Tinius Olsen Testing Machine Company, Philadelphia, Pa., a corporation of Pennsylvania Application December 31, 1941, Serial No. 425,092

12 Claims. (Cl. 73—66)

In the art of balancing rotatable bodies, it is customary in one type of balancing machine to revolve the test body while supported on a vibratory support or cradle having a selected fixed pivot for vibratory movements of the support and test body. The vibratory movements of the vibratory support due to unbalanced forces in the test body cause wear of the cooperative surfaces of the pivot members, even when anti-friction devices such as ball bearings are employed, and, under such conditions of wear, the unbalance readings are not always strictly accurate. It has also been found that in some cases, especially where the test body is revolved at high speed and an electronic system is employed to measure the unbalance, more satisfactory results can be obtained if the means for forming the selected fixed pivot eliminates any lost motion at such pivot.

It is, therefore, an object of this invention to devise novel pivot forming means for balancing machines which will provide a locked pivot in a selected plane without lost motion at such fixed and locked pivot.

With the above and other objects in view, as will hereinafter clearly appear, my invention comprehends novel pivot forming mechanism for balancing machines.

It further comprehends a novel vibratory support, novel pivot stands, and novel means cooperating with the support and pivot stand to establish a selected fixed pivot for vibratory movements of the support and test body due to unbalanced forces in the test body.

Other novel features of construction and advantage will hereinafter appear in the detailed description and the appended claims.

For the purpose of illustrating the invention, I have shown in the accompanying drawings a preferred embodiment thereof which I have found in practice to give satisfactory and reliable results. It is, however, to be understood that the various instrumentalities of which the invention consists can be variously arranged and organized and the invention is not limited to the exact arrangement and organization of these instrumentalities as herein shown.

Figure 1 is a perspective view of a balancing machine having pivot forming mechanism embodying the invention.

Figure 2 is a front elevation of a portion of the pivot forming mechanism.

Figure 3 is an end elevation showing the rack and certain of its adjuncts.

Figure 6 is a front elevation, partly broken away, of a portion of a pivot stand, cradle crossbar and pivot locking mechanism.

Similar numerals of reference indicate corresponding parts.

Figure 4:
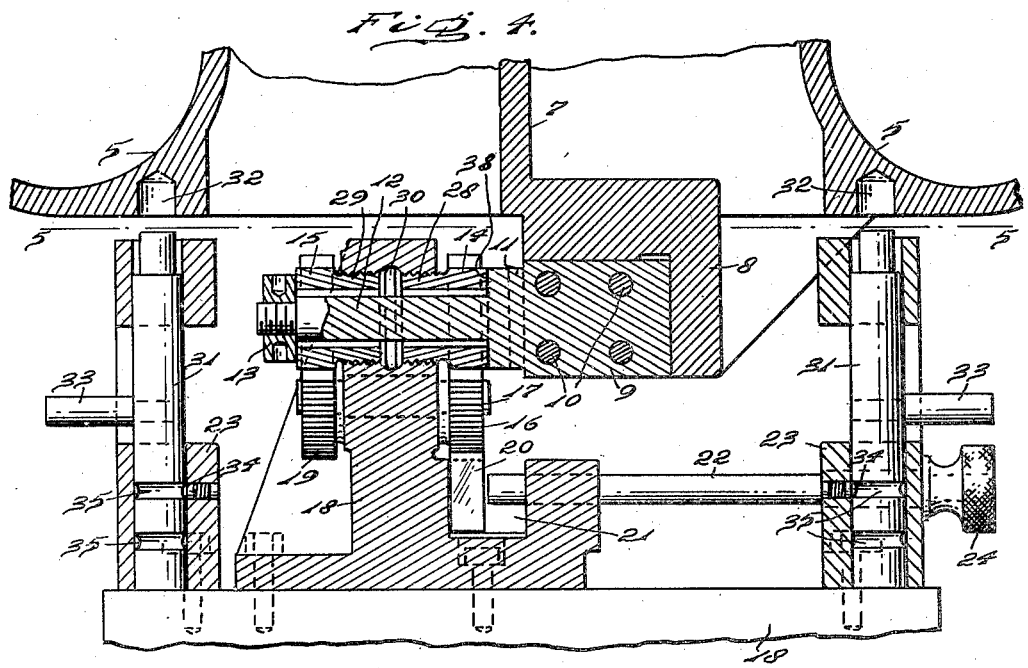
Figure 4 is a transverse section of the pivot forming mechanism.
Figure 5:
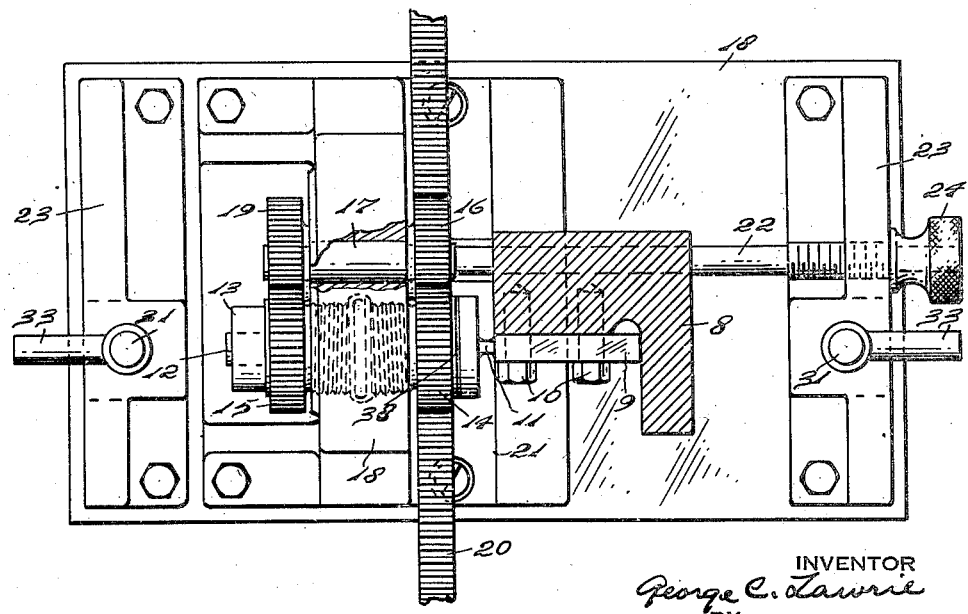
Figure 5 is a section on line 5—5 of Figure 4.

Referring to the drawings:

The construction and operation of balancing machines is now well known in the art, and, since this invention relates more particularly to novel means for forming a selected fixed pivot for vibratory movements of the revolving test body, due to unbalanced forces therein, it has been deemed necessary in this case to describe the construction and operation of the balancing machine in only sufficient detail for a clear understanding of the pivot forming mechanism.

1 designates the base or bed of a balancing machine in conjunction with which pivot forming mechanism embodying my invention is employed. The base has longitudinally extending slots 2, along which vibratory members 3 can be adjusted and fixed in position in the conventional manner. The members 3 at their upper ends are connected to a vibratory support or cradle 4 on which a test body can be revolved.

The vibratory support 4 has cross brackets 5 which serve as the support for the test body and certain of which form part of the pivot forming mechanism. These brackets are longitudinally adjustable on side rails 6 of the vibratory support, and are provided with conventional means to fix them in their adjusted position. The brackets of the pivot forming mechanism have centrally disposed depending webs 7, see Figure 4, which merge into offset blocks 8 which are angularly cut away to receive fulcrum members 9, fixed to their blocks by bolts 10. Each fulcrum member is of reduced thickness at 11 to form a flexible pivot, and is provided with a laterally extending rod 12, of reduced diameter at its free end and threaded to receive a nut 13, which, as will hereinafter be explained, serves as a stop or abutment.

The rod 12 extends with a clearance through gears 14 and 15. The gear 14 meshes with a gear 16 on a shaft 17, journalled in a pivot standard 18, and provided with a gear 19 meshing with the gear 15. The gears 16 mesh with a rack 20, slidable in slots 21 in the pivot standards 18, and the rack is maintained in meshing condition with the gears 16 of right and left pivot assemblies by a rod 22, guided in its pivot standard and in threaded engagement with a standard 23, mounted on its pivot standard 18.

The rod 22 has a handle 24. The rack 20 is longitudinally adjusted by the turning of a handle 25 on a shaft 26, journalled in the machine frame and having a pinion 27, in mesh with the rack 20. It will be seen from Figure 3 that the teeth of the pinion are much wider than those of the rack, so that, when the rack is moved laterally out of mesh with the pinion 16 of the right and left pivot assemblies, the pinion 27 will be retained in mesh with the rack, and the crank handle 25 will not drop down but will be retained in its raised position.

The gear 14, see Figure 4, has a threaded portion 28, of reduced diameter in threaded engagement with its pivot standard. In a similar manner, the gear 15 has a threaded portion 29 in threaded engagement with the same pivot standard. The threaded portions 28 and 29 have their threads oppositely directed, and, as shown, the portion 28 has a right hand thread, and the portion 29 has a left hand thread. A clearance space 30 is provided between the juxtaposed ends of the gears 14 and 15. The threads on gears 14 are oppositely directed in the right and left pivot members.

In order to provide for a cross bracket and its pivot stand moving as a unit when changing the location of pivot planes, a pair of standards 23 have vertically adjustable in them locking plungers 31, having their upper ends adapted to be received in recesses 32 in cross brackets of the pivot forming mechanism. The locking plungers 31 have handles 33 and are retained in the positions to which they have been adjusted by locking bolts 34 received in annular grooves 35 in the locking plungers.

A motor 36 is operatively connected in any desired manner with a shaft 37, connected in the conventional manner with a test body 39 to revolve it.

The operation

The manner in which a selected pivot is formed for vibratory movements due to unbalanced forces in a revolving test body will now be apparent to those skilled in this art and is as follows:

The test body is placed on cross brackets of the vibratory support, and connected with the motor driven spindle of the balancing machine in any conventional manner. The fastening devices for the standards 18 and 23 are loosened, so that such standards can be longitudinally moved along the bed to bring a pivot 11 into a selected plane of the test body. The handles 33 are now raised to move the locking plungers 31 into the recesses 32 of cross brackets of the pivot forming mechanism. The rod 22 is moved outwardly and the rack 20 moved laterally out of mesh with the gears 16. A cross bracket and its pivot stand can now be moved as a unit into a selected position. The cross brackets of the pivot forming mechanism are fixed to the side rails of the vibratory support, and the standards 18 are fixed to the bed of the balancing machine. The handles 33 are now lowered to move the locking plungers 31 out of the recesses 32, and the rack 20 is moved laterally into mesh with the gears 16. The rod 22 is moved inwardly to retain the rack 20 in its gear meshing position with the gears 16.

Since the locking of one pivot effects the unlocking of the other pivot, a description of the locking of only the left pivot is deemed necessary. The gear 15 at the right hand pivot has its threads directed oppositely to the threads of the gear 15 at the left hand pivot. In the position of the parts as shown in Figure 1, the right pivot is locked. To lock the left pivot and unlock the right pivot, the handle 25 is turned in a clockwise direction as shown by the arrow, causing the rack 20 to move to the left, thus causing the gear 16 of the left pivot assembly to turn in a clockwise direction and the gear 14 to turn in an anti-clockwise direction. The gear 15 will turn in an anti-clockwise direction. This causes the gear 15 to move to the left to contact with the abutment 13, and the gear 14 to move to the right to contact the shoulder 38 of the fulcrum plate 9. The vibratory support will now swing on the fixed pivot 11 of the left pivot assembly. When the handle 25 is returned to the position seen in Figure 2, the right pivot will be locked and the left pivot will be unlocked.

The amount and angle of unbalance in the test body is determined in any desired or conventional manner and the proper correction made on the test body.

When a pivot is clamped, the vibratory support for the test body is centered over the bed.

The type of pivot forming mechanism has been more particularly designed as here shown for the balancing of test bodies which are to revolve at very high speeds, such as for example, propeller shafts.

Having thus described my invention, what I claim as new and desire to secure by Letters Patent is:

1. In a balancing machine, a bed, a vibratory support on said bed, two brackets adjustable along the support, depending members on said brackets, means to revolve a test body on said support, fulcrum members fixed to said depending members, each of said fulcrum members having a flexible portion serving as a pivot and having an extension outboard of its pivot, pivot stands longitudinally adjustable along said bed and having openings through which said extensions pass, abutments at the free ends of said extensions, abutments inboard of said end abutments, a pair of gears disposed in axial alignment having extended hubs with oppositely directed threads in threaded engagement with the wall of each opening and having openings through which an extension passes with a clearance, and having gear portions inboard and outboard of said pivot stand, and means to turn a selected pair of gears to cause their gear portions to clamp against said abutments to establish a fixed pivot for vibratory movements of said vibratory support.

2. In a balancing machine, a bed, a vibratory support on said bed, two cross brackets adjustable along the support, depending members on said brackets, means to revolve a test body on said support, fulcrum members fixed to said depending members, each of said fulcrum members having flexible portions serving as pivots and having extensions outboard of said pivots, pivot stands longitudinally adjustable along said bed and having openings through which said extensions pass, abutments spaced on said extensions, a pair of gears disposed in axial alignment having extending hubs with oppositely directed threads in threaded engagement with the wall of each opening and having openings through which an extension passes with a clearance and having gear portions inboard and outboard of said pivot stand between said abutments, and a rack and pinion operatively connected with said gears to turn them to cause the gears to clamp with or be released from clamping engagement with said abutments.

3. In a balancing machine, a bed, a vibratory support on said bed, two cross brackets adjustable along the support, depending members on said brackets, means to revolve a test body on said support, fulcrum members fixed to said depending members, each fulcrum member having a flexible portion serving as a pivot and extensions outboard of said pivot, pivot stands longitudinally adjustable along said bed and having openings through which said extensions pass, abutments spaced on said extensions, a pair of gears disposed in axial alignment having hubs with oppositely directed threads in threaded engagement with the wall of each opening and having openings through which an extension passes with a clearance and having gear portions inboard and outboard of said pivot stand, a rack and pinion operatively connected with said gears to turn them to cause them to clamp with or be released from clamping engagement with said abutments, and a manually actuated member to retain a rack in operative position.

4. In a balancing machine, a bed, a vibratory support for a test body on said bed, a pair of cross brackets adjustable along the support and having dependable portions intermediate their ends, pivot stands adjustable along the bed, pivot members fixed to said depending portions of said cross brackets extending laterally therefrom and having flexible portions serving as pivots at the median, vertical plane of said vibratory support, and means to lock a selected pivot stand with its pivot member to establish a selected fixed pivot for vibratory movements of the vibratory support.

5. In a balancing machine, a bed, a vibratory support mounted on said bed, a pivot stand adjustable along said bed, a pivot member fixed at one end to said vibratory support, said pivot member having a flexible portion serving as a pivot and an abutment disposed intermediate its ends, a second abutment at the free end of said pivot member, a pair of clamping members movably carried by said pivot stand, positioned between said abutments, and having openings through which said pivot member passes with a clearance, and means to move said clamping members in opposite directions into clamped engagement with said abutments to establish a fixed pivot for vibratory movements of said vibratory support.

6. In a balancing machine, a bed, a vibratory support on the bed, cross brackets adjustable on the support, pivot forming members attached at one end to said cross brackets and thereby to said vibratory support having flexible portions serving as pivots and spaced abutments, a pair of clamping members for each pivot member, positioned between its abutments and having openings through which the pivot forming members pass with a clearance, pivot stands on the bed and with which the clamping members are in threaded engagement, and means to move a pair of clamping members into clamped engagement with their abutments to establish a selected fixed pivot for said vibratory support.

7. In a balancing machine, a bed, a vibratory support on said bed, a pivot stand on said bed, a fulcrum member fixed at one end to said vibratory support and having a flexible portion serving as a pivot, spaced abutments on said fulcrum member, clamping members having openings through which said fulcrum member passes with a clearance, positioned between said abutments and in threaded engagement with said pivot stand, and means to move said clamping members into clamped engagement with said abutments to establish a fixed pivot for vibratory movements of said vibratory support.

8. In a balancing machine, a bed, a vibratory support on said bed, cross brackets adjustable along said vibratory support, pivot stands on the bed, pivot forming members having flexible portions serving as pivots, said brackets having depending portions intermediate their ends to which said pivot forming members are fixed at one side of their pivots, and at one of their ends, said pivot forming members terminating in rods having abutments near their inner ends, abutments at the outer ends of said rods, a pair of tubular clamping members for each pivot forming member and in threaded engagement with a pivot stand at opposite sides thereof to move in opposite directions against the abutments of a pivot member, and having a clearance with the rod and abutments of a pivot member when in unclamped position, a rack intergeared with said clamping members, and means to move said rack to cause the clamping members of one pivot stand to clamp against the abutments of their cooperating pivot forming members and the clamping members of the other pivot stand to move out of clamped engagement with the abutments of their cooperating pivot forming member.

9. In a balancing machine, a bed, a vibratory support carried by the bed, two cross brackets adjustable along the vibratory support and having depending portions intermediate their ends, pivot stands adjustable along the bed, a pivot member fixed at one end to the depending portion of each bracket, extending laterally therefrom and having a flexible portion serving as a pivot disposed centrally of said vibratory support, and means to clamp a selected pivot member to its stand and thereby center the vibratory support over said bed.

10. The construction set forth in claim 8, in which the clamping means has a crank operated pinion in mesh with the rack and with the teeth of the pinion wider than those of the rack and clamping members, whereby the rack is movable out of mesh with the clamping members and retained in mesh with the pinion.

11. In a balancing machine, a bed, a vibratory support mounted on said bed, a pivot stand adjustable along said bed, a pivot member having one end fixed to said support and having its opposite end unsupported, said pivot member having a flexible portion serving as a pivot disposed centrally of said vibratory support, and having spaced abutments at one side of said pivot, a pair of clamping members in threaded engagement with the pivot stand between said abutments and having an aperture through which said pivot member extends, and means to move said clamping members into clamped engagement with said abutments to establish a fixed pivot for vibratory movements of said vibratory support and to center said support over said bed.

12. In a balancing machine, a bed, a vibrating support for a test body on said bed, a cross bracket adjustable along the support, a pivot stand adjustable along the bed, a pivot member fixed to said cross bracket, extending laterally therefrom and having a flexible portion serving as a pivot at the median vertical plane of said vibratory support, and means to lock said pivot stand with its pivot member to establish a fixed pivot for vibratory movements of the vibratory support.

GEORGE C. LAWRIE.